United States Patent
Mayer et al.

(10) Patent No.: US 7,252,014 B1
(45) Date of Patent: Aug. 7, 2007

(54) INSTRUMENT AND METHOD FOR MEASURING THE VOLUME OF A HERMETICALLY SEALED VARIABLE VOLUME AND PRESSURE CONFORMING CONTAINER

(75) Inventors: Daniel W. Mayer, Wyoming, MN (US); Timothy A. Ascheman, Ramsey, MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 11/405,215

(22) Filed: Apr. 17, 2006

(51) Int. Cl.
G01M 3/34 (2006.01)
G01F 1/00 (2006.01)
B65B 31/00 (2006.01)

(52) U.S. Cl. .......................... 73/861; 73/49.3; 53/79; 53/403

(58) Field of Classification Search ............... None
See application file for complete search history.

(56) References Cited

U.S. PATENT DOCUMENTS

| | | | |
|---|---|---|---|
| 3,101,613 A | 8/1963 | Kuntz | |
| 3,633,416 A | 1/1972 | Van Dyke et al. | |
| 3,922,525 A | 11/1975 | Kozak et al. | |
| 4,067,239 A | 1/1978 | Arvisenet | |
| 4,105,138 A | 8/1978 | Lemann et al. | |
| 4,268,967 A | 5/1981 | Brana et al. | |
| 4,774,830 A | 10/1988 | Hulsman | |
| 4,934,180 A | 6/1990 | Hulsman | |
| 5,203,822 A | 4/1993 | Gurich et al. | |
| 5,212,993 A | 5/1993 | Mayer | |
| 5,285,678 A | 2/1994 | McDaniel et al. | |
| 5,332,008 A | 7/1994 | Todd et al. | |
| 5,354,569 A * | 10/1994 | Brown et al. | 426/411 |
| 5,564,306 A | 10/1996 | Miller | |
| 5,570,694 A | 11/1996 | Rometsch | |

(Continued)

FOREIGN PATENT DOCUMENTS

EP  0 883 744 B1  2/1997

(Continued)

OTHER PUBLICATIONS

Arndt, George W. Jr., "Examination of Containers for Integrity", Bacteriological Analytical Manual Online, Jan. 2001, 1-31 Pages, Chapter 22C, U. S. Food & Drug Administration.

*Primary Examiner*—Harshad Patel
(74) *Attorney, Agent, or Firm*—Sherrill Law Offices, PLLC

(57) ABSTRACT

An instrument and method for measuring the volume of a hermetically sealed, variable volume, pressure conforming container. The instrument includes a needle, a vacuum pump, a mass flow rate sensor and an integrator. The needle has a lumen operable for sealingly perforating a container and thereby placing the lumen of the needle in fluid communication with a retention chamber defined by the container. The vacuum pump evacuates the gaseous content from the retention chamber through the lumen defined by the needle and past a mass flow rate sensor for sensing mass flow rates pulled through the lumen and transmitting corresponding mass flow rate signals over time to the integrator. The integrator is programmed to integrate the received mass flow rate signals over time through achievement of an evacuated retention chamber to generate a total mass value, and calculate a volume from the total mass value employing the Ideal Gas Law.

12 Claims, 3 Drawing Sheets

U.S. PATENT DOCUMENTS

| | | |
|---|---|---|
| 6,189,223 B1 | 2/2001 | Haug |
| 2003/0084957 A1 | 5/2003 | Seltz et al. |
| 2005/0273016 A1* | 12/2005 | Colman et al. ............. 600/529 |
| 2006/0011237 A1 | 1/2006 | Tison et al. |

FOREIGN PATENT DOCUMENTS

| | | |
|---|---|---|
| EP | 0 904 793 A2 | 9/1998 |
| GB | 2 311 865 A | 4/1997 |
| JP | 57127830 A | 8/1982 |
| JP | 6 201432 | 7/1994 |
| WO | 2006/076110 A2 | 7/2006 |
| WO | 2006/083400 A2 | 8/2006 |

* cited by examiner

INSTRUMENT AND METHOD FOR MEASURING THE VOLUME OF A HERMETICALLY SEALED VARIABLE VOLUME AND PRESSURE CONFORMING CONTAINER

BACKGROUND

Perishable products, such as packaged foods, have a shelf life which must be ascertained so that stale product is not sold to consumers. The shelf life of such products is commonly imprinted upon the package as the "expiration date" or "freshness date". Manufacturers, distributors and retailers of perishable products commonly prioritize the shipment, distribution and display of such products based upon the expiration date or freshness date of the product to reduce the amount of expired product which must be discarded.

One example of efforts taken to increase the shelf life of perishable products is flushing of the packaging with an inert gas, such as nitrogen, to reduce the oxygen concentration within the packaging.

The shelf life of a perishable product can be determined by several methods depending upon the particular product involved (i.e., potato chips v. soft drinks). One of the variables often involved in determining shelf life is the volume of the container. Such a calculation is relatively simple when the container is a rigid container with a fixed volume (i.e., a paperboard cylinder such as that employed to package PRINGLES® potato crisps), but becomes much more difficult when the container has a variable volume (i.e., a MYLAR potato chip bag).

Currently available instruments for measuring or estimating the volume of a variable volume container, such as those disclosed in U.S. Pat. Nos. 4,268,967 and 6,189,223, are unacceptably inaccurate, prohibitively expensive, difficult to conduct and/or slow.

Accordingly, a need exists for an inexpensive, quick, easy and accurate method and instrument for measuring the volume of a variable volume container.

SUMMARY OF THE INVENTION

A first aspect of the invention is an instrument for measuring the volume of a hermetically sealed, variable volume, pressure conforming container. The instrument includes a needle, a vacuum pump, a mass flow rate sensor and an integrator. The needle has a lumen operable for sealingly perforating a hermetically sealed, variable volume, pressure conforming container so as to place the lumen of the needle in fluid communication with a retention chamber defined by the container. The vacuum pump is in fluid communication with the lumen for evacuating gaseous content from the retention chamber defined by the hermetically sealed, variable volume, pressure conforming container through the lumen defined by the needle. The mass flow rate sensor is in sealed fluid communication with the lumen defined by the needle for sensing mass flow rates pulled through the lumen and transmitting corresponding mass flow rate signals over time to the integrator. The integrator is in electrical communication with the mass flow rate sensor for receiving the mass flow rate signals, and programmed to (i) integrate the received mass flow rate signals over time through achievement of an evacuated retention chamber to generate a total mass value, and (ii) calculate a volume from the total mass value employing the ideal gas law.

A second aspect of the invention is a method for measuring the volume of a hermetically sealed, variable volume, pressure conforming container. The method includes the steps of (1) obtaining a hermetically sealed, variable volume, pressure conforming container defining a retention chamber, (2) suctioning fluid from the retention chamber through a mass flow rate sensor for sensing mass flow rates of fluid suctioned from the retention chamber over time, (3) integrating the sensed mass flow rates over time through achievement of an evacuated retention chamber to generate a total mass value, and (4) calculating a volume for the container from the total mass value employing the ideal gas law.

DETAILED DESCRIPTION OF THE INVENTION INCLUDING A BEST MODE

Nomenclature
10 Instrument
15 Housing
16 Inlet Port Through the Housing
17 Outlet Port Through the Housing
20 Needle
21 Distal End of Needle
29 Lumen of Needle
30 Mass Flow Rate Sensor
40 Vacuum Pump
50 Processor
55 Memory
60 Hardware Interface Port
70 Collective Reference to Leads 70a, 70b, 70c and 70d.
70a Lead from the Power Button to the Processor
70b Lead from the Display Unit to the Processor
70c Lead from the Vacuum Pump to the Processor
70d Lead from the Mass Flow Rate Sensor to the Processor
71 Leads from the Processor to the Battery
80 Collective Reference to Tubing 80a, 80b and 80c
80a Length of Tubing Interconnecting the Needle and the Vacuum Pump
80b Length of Tubing Interconnecting the Vacuum Pump and the Mass Flow Rate Sensor
80c Length of Tubing from the Mass Flow Rate Sensor to the Exit Port through the Housing
90 User Interface Components
91 Power Button
92 Display Device
100 Packaging
101 Solids Content of Packaging
102 Gaseous Content of Packaging
109 Retention Chamber Defined by Packaging
200 Septum
300 Battery
C Clear Button
S Start Button Definitions As utilized herein, including the claims, the phrase "hermetically sealed container" includes true hermetically sealed containers and containers intended to be hermetically sealed but having one or more small leaks resulting in a combined rate of flow through the leaks of less than 400 cm$^3$ per minute at 200 mm Hg.

As utilized herein, including the claims, the Ideal Gas Law refers to the mathematical equation set forth below which is deduced from kinetic theory. The ideal gas law can be viewed as arising from the kinetic pressure of gas molecules colliding with the walls of a container in accordance with Newton's laws.

$$PV=nRT=NkT$$

Where:
P=Pressure
V=Volume
T=Tempearture
n=Number of moles
R=Universal gas constant=8.3145 J/mol K
N=number of molecules
k=Boltzmann constant=1.38066×10$^{-23}$ J/K=8.617385× 10$^{-5}$ eV/K
k=R/N$_A$
N$_A$=Avogadro's number=6.0221×10$^{23}$/mo Underlying Discovery The invention disclosed herein is based upon the discovery that the Ideal Gas Law can accurately and consistently describe the volume of a variable volume pressure conforming container—provided the composition of the gaseous content within the container is known—by simply (i) allowing the container to reach room temperature, (ii) measuring room temperature (T) and room pressure (P), (iii) measuring the amount of gaseous content within the container by suctioning the gaseous content of the container through a mass flow rate sensor, (iv) converting mass flow rate to number of moles (n) or number of molecules (N) based upon the known composition of the gas content (i.e., air has an average molecular weight of 28.9 grams/mole while a nitrogen flushed headspace containing 99% N$_2$ and 1% O$_2$ has an average molecular weight of 28.0 grams/mole), and (iv) solving the Ideal Gas Law for V employing these values.

Instrument

Figure 1:
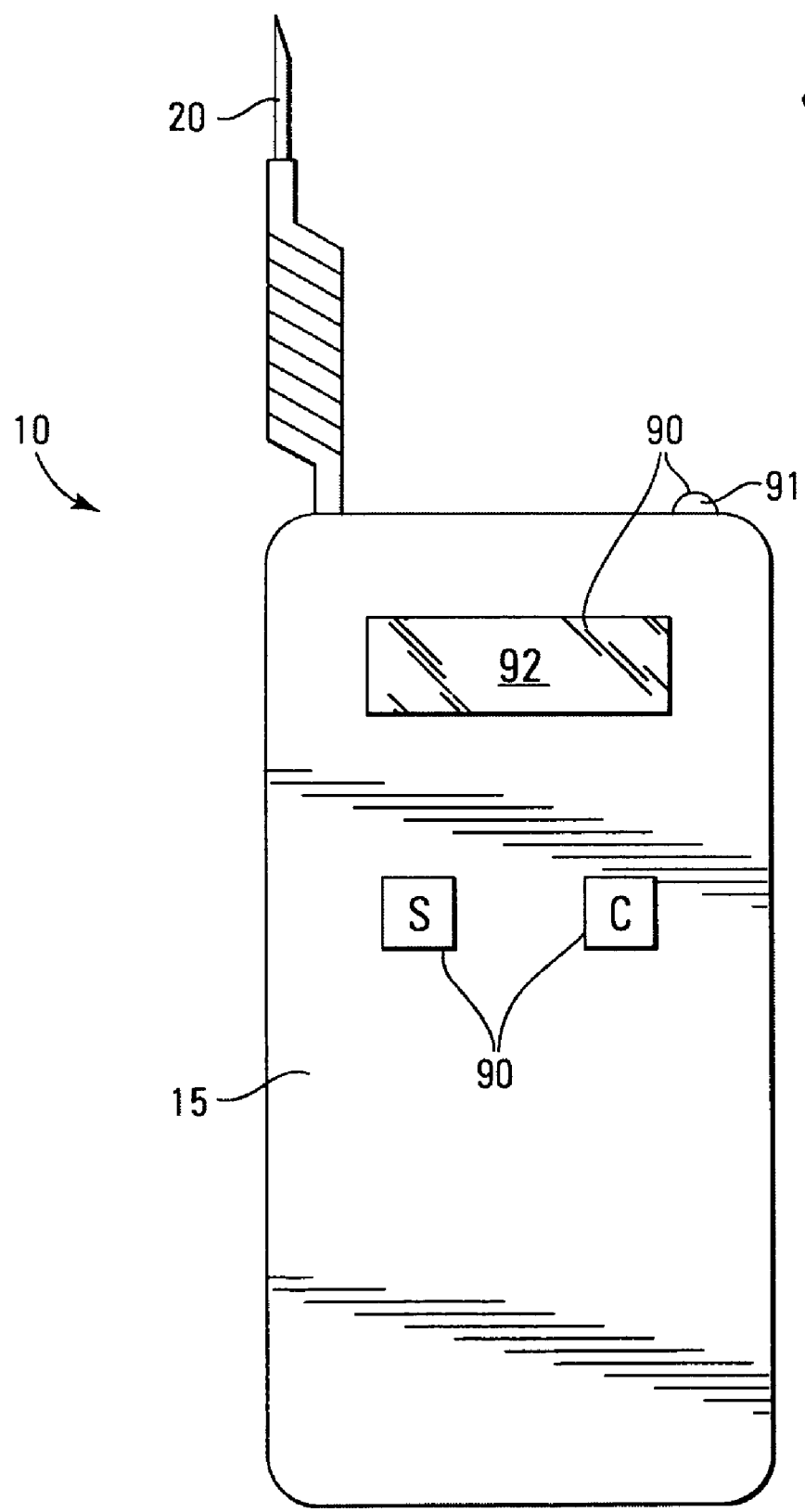
FIG. 1 is a front view of one embodiment of the invention.
Figure 2:
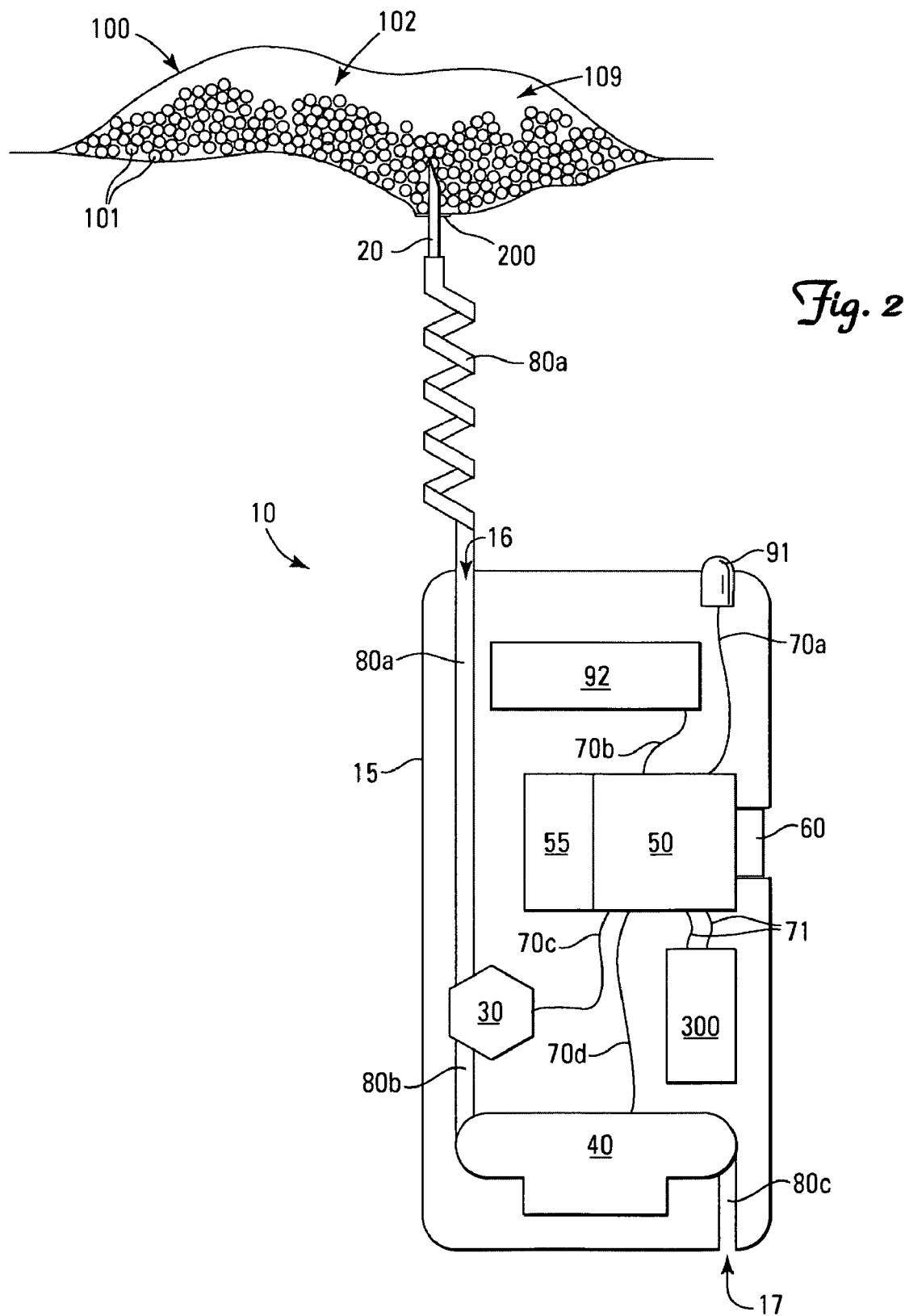
FIG. 2 is a schematic view of the internal components of the invention shown in FIG. 1 with the needle inserted through a flexible bag containing a snack food.

As shown in FIGS. 1 and 2, a first aspect of the invention is an instrument 10 for measuring the volume of a hermetically sealed, variable volume, pressure conforming container 100.

The instrument 10 can be effectively employed with a wide variety of hermetically sealed, variable volume, pressure conforming packaging 100 containers ranging from fairly rigid packaging such as thin-walled polyvinyl chloride tubes, through semi-flexible packaging 100 such as wax-coated cartons and thin-walled polyethylene bottles, to highly flexible packaging 100 such as bags made from polyethylene terephthalate (i.e., MYLAR®) or polyethylene films.

Referring to FIGS. 1 and 2, the first aspect of the instrument 10 includes a needle 20, a mass flow rate sensor 30, a vacuum pump 40, and a processor 50, along with user interface components 90 including at least a power button 91 and a display device 92. The instrument 10 preferably includes a hardware interface port 60. Appropriate tubing 80a and 80b (hereinafter collectively referenced along with tubing 80c as tubing 80) sequentially interconnect the needle 20, mass flow rate sensor 30, and vacuum pump 40, respectively. Appropriate electrical leads 70a, 70b, 70c and 70d (hereinafter collectively referenced as electrical leads 70) electrically connect the processor 50 to the power button 91, the display device 92, the mass flow rate sensor 30, and the vacuum pump 40, respectively.

Figure 3:
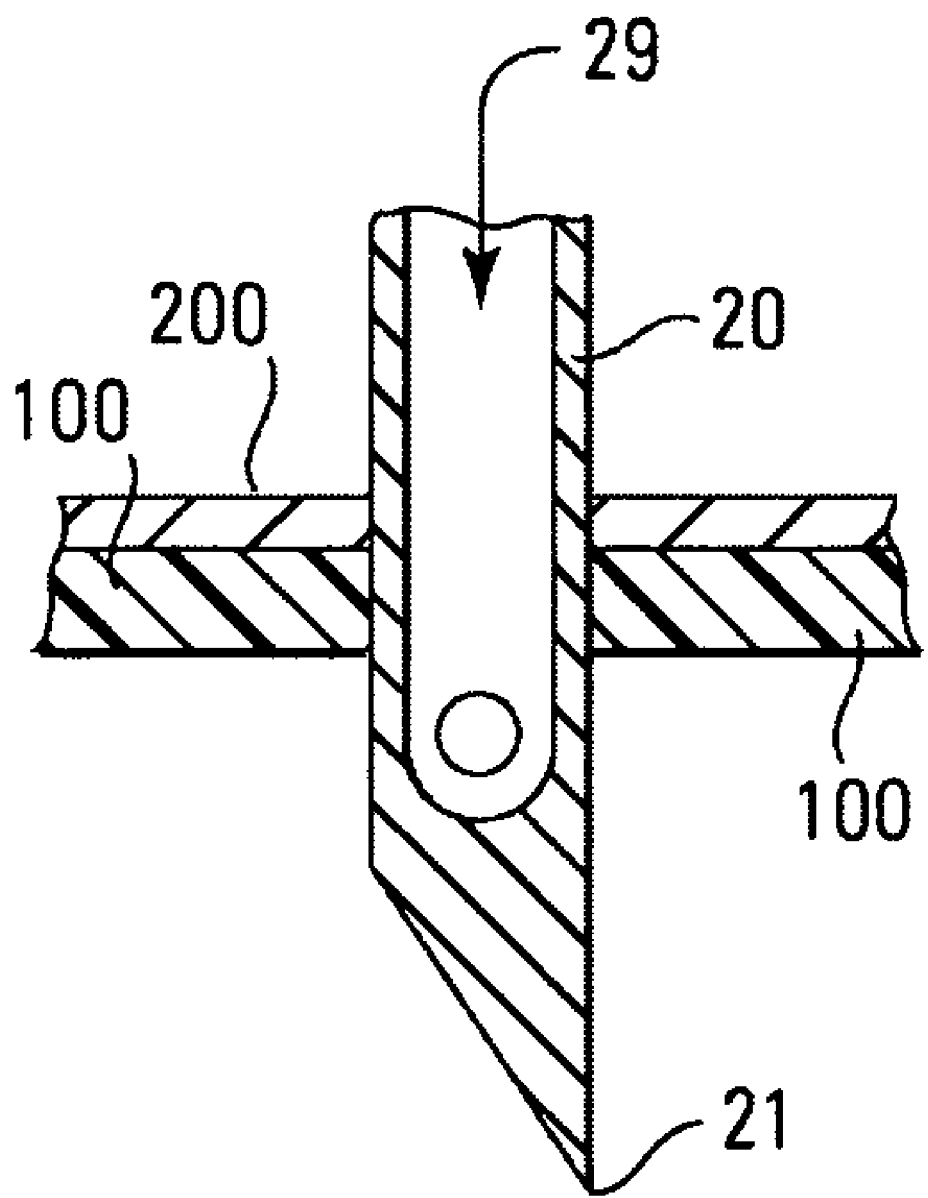
FIG. 3 is an enlarged view of the needle at the insertion point into the bag as shown FIG. 2.

As shown in FIG. 3, the needle 20 is configured and arranged with a lumen 29 and a sharp pointed distal end 21 effective for piercing a sidewall (unnumbered) of the packaging 100. A septum 200 is preferably adhered to the sidewall of the packaging 100—especially when the packaging 100 is highly flexible—prior to piercing of the packaging 100 with the needle 20 in order to maintain a hermetic seal around the needle 20.

Referring to FIG. 2, a vacuum pump 40 is sealingly connected to the lumen 29 of the needle 20 by tubing 80a and 80b. Once the needle 20 has been inserted through packaging 100, operation of the vacuum pump 40 is effective for evacuating the gaseous content 102 from the retention chamber 109 defined by the packaging 100 through the lumen 29 of the needle 20.

Substantially any type of vacuum pump 40 is suitable for use in the instrument 10, with selection dependent primarily upon choice of power source (i.e., battery or electrical power lines), desired level of portability (i.e., hand-held or desktop), and intended use (i.e., testing of large volume or small volume packaging 100). For most applications, a vacuum pump 40 with a maximum gas volumetric flow rate of about 250 to 6,000 cm$^3$/minute and capable of pulling a vacuum of greater than about 0.5 lb/in$^2$, preferably 1-4 lb/in$^2$, using standard consumer batteries (e.g., AAA, AA, A, C, D or 9-volt batteries) will be sufficient.

As shown in FIG. 2, a mass flow rate sensor 30 is positioned upstream from the vacuum pump 40 for measuring the mass flow rate pulled from the retention chamber 109 by the vacuum pump 40. The mass flow rate sensor 30 may alternatively be positioned downstream from the vacuum pump 40. The mass flow rate of interest is the mass flow rate measured until the gaseous content 102 has been evacuated from the retention chamber 109 and an essentially steady state flow has been established from the retention chamber 109, indicating that the original gaseous content 102 has been evacuated from the retention chamber 109 and any further mass flow is the result of flow through a leak in the packaging 100.

Suitable gas mass flow rate sensors 30 for use in the instrument 10 are available from a number of sources, including MKS Instruments of Wilmington, Mass.

A check valve (not shown) is preferably positioned upstream from the mass flow rate sensor 30 (i.e., between the needle 20 and the mass flow rate sensor 30) to prevent any return flow of gaseous content 102 back into packaging 100, a phenomenon often observed when pulling a vacuum.

Referring to FIG. 2, the mass flow rate sensor 30 and vacuum pump 40 are operably interconnected to a microcontroller or processor 50 by appropriate leads 70c and 70d respectively, for controlling operation of these components, and receiving and processing data signals generated by the mass flow rate sensor 30. The processor 50 is connected to a suitable power source, such as a battery 300, by electrical leads 71. The mass flow rate sensor 30, vacuum pump 40, processor 50, associated electrical leads 70 and tubing 80, as well as battery 300, are preferably retained within a single housing 15 which is equipped with (i) an inlet port 16 configured and arranged to attach to tubing 80a in order to place the needle 20 into fluid communication with the components retained within the housing 15, and (ii) an outlet port 17 attached by tubing 80c to the vacuum pump 40 for venting fluid pumped from the retention chamber 109 by the vacuum pump 40.

Referring to FIG. 1, the top panel (unnumbered) and front face (unnumbered) of the housing 15 includes the necessary and appropriate user interface components 90 including (i) a power ON/OFF switch 91, and (ii) a display device 92 for generating a perceptible signal 92 indicating the volume of a tested package 100, such as an LCD screen. The display device 92 is operably interconnected to the microcontroller or processor 50 by electrical lead 70b.

As shown in FIG. 2, the microcontroller or processor 50 includes associated memory 55 for storing data values received from the mass flow rate sensor 30 and optionally the calculated package volume.

The microcontroller or processor 50 is programmed to (1) receive user input data for room temperature (T) and room pressure (P), and (ii) receive data values from the mass flow rate sensor 30 over time as the vacuum pump 40 pumps the gaseous content 102 of a test package 100 through the mass flow rate sensor 30. After receiving these values, the microcontroller or processor 50 then (a) integrates the data values received from the mass flow rate sensor 30 over time—until a steady state flow was reached—to obtain a mass value, (b) converts the mass value to number of moles (n) or number of molecules (N), and then (c) calculates the volume of the test package 100 using the Ideal Gas Law. The microcontroller or processor 50 then communicates the calculated volume to the user via the display device 92 and/or transmits this data to a peripheral device such as a central processing unit or printer via the hardware interface port 60.

The instrument 10 may be constructed as a portable or desktop unit.

Use

A unit of packaging 100 having a gaseous content 102, and typically a solids content 101 of a perishable good, and is selected for analysis. The power switch 91 is depressed to activate the instrument 10 and the START button S is depressed. The instrument 10 may optionally direct the user to insert the needle 20 into the test packaging 100.

A septum 200 is optionally adhered to the outer surface (unnumbered) of the packaging 100. The septum 200 and packaging 100 are perforated by the distal end 21 of the needle 20 a sufficient distance to place the lumen 29 into fluid communication with the retention chamber 109 defined by the packaging 100. The needle 20 is then left in the inserted position for the balance of the procedure.

The user then initiates analysis by again pressing the START button S. The vacuum pump 40 is activated to evacuate the gaseous content 102 from the retention chamber 109 defined by the packaging 100. The mass flow rate sensor 30 is activated to sense the mass flow rate of gas through the tubing 80 over time and transmits this data to the processor 50.

When the mass flow rate of gas through the tubing 80 reaches a steady state value, the processor 50 establishes a stop point along the time line indicative of the time at which the original gaseous content 102 of the packaging 100 has been fully evacuated and any residual flow through the tubing 80 is the result of gas flow through leak(s) in the packaging 100. The processor 50 then (a) integrates the mass flow values received from the mass flow rate sensor 30 up to the stop point to obtain a mass value, (b) converts the mass value to number of moles (n) or number of molecules (N) based upon predefined or user input data as to the average molecular weight of the gas content 102 evacuated from the packaging 100, and then (c) calculates the volume of the test package 100 using the Ideal Gas Law. The microcontroller or processor 50 then communicates the calculated volume to the user via the display device 92 and/or transmits this data to a peripheral device such as a central processing unit or printer via the hardware interface port 60.

The testing procedure can then be repeated by pressing the CLEAR button C followed by pressing the START button S.

EXAMPLES

Example 1

The instrument was deployed to measure the volume of a 1 oz. bag of MAP packaged potato chips containing approximately 99% $N_2$ and 1% $O_2$. The bag was allowed to equilibrate to room temperature (20° C.) and room pressure (1 atmosphere). The mass flow rate sensor sensed and reported the following flow rate values to the processor.

| TIME (sec) | FLOW (mg/sec) | TOTAL MASS (mg) |
|---|---|---|
| 1 | 0.00 | 0.00 |
| 2 | 6.32 | 6.32 |
| 3 | 33.7 | 43.2 |
| 4 | 32.6 | 75.8 |
| 5 | 32.4 | 108 |
| 6 | 24.2 | 132 |
| 7 | 9.77 | 142 |
| 8 | 0.0292 | 142 |
| 9 | 0.0250 | 142 |
| 10 | 0.0271 | 142 |
| 11 | 0.0271 | 142 |
| 12 | 0.0271 | 142 |
| 13 | 20.5 | 163 |
| 14 | 75.2 | 238 |
| 15 | 78.1 | 316 |
| 16 | 61.4 | 378 |
| 17 | 23.3 | 401 |
| 18 | 4.41 | 405 |
| 19 | 0.212 | 406 |
| 20 | 0.204 | 406 |
| 21 | 0.212 | 406 |
| 22 | 0.214 | 406 |
| 23 | 0.217 | 406 |
| 24 | 0.214 | 407 |
| 25 | 0.212 | 407 |
| 26 | 0.212 | 407 |
| 27 | 0.210 | 407 |
| 28 | 0.208 | 407 |
| 29 | 0.208 | 408 |
| 30 | 0.204 | 408 |
| 31 | 0.200 | 408 |
| 32 | 0.198 | 408 |
| 33 | 0.194 | 408 |
| 34 | 0.194 | 409 |
| 35 | 0.192 | 409 |
| 36 | 0.185 | 409 |
| 37 | 0.183 | 409 |
| 38 | 0.181 | 409 |
| 39 | 0.181 | 410 |
| 40 | 0.181 | 410 |
| 41 | 0.183 | 410 |
| 42 | 0.181 | 410 |
| 43 | 0.175 | 410 |
| 44 | 0.171 | 410 |
| 45 | 0.167 | 411 |
| 46 | 0.167 | 411 |
| 47 | 0.162 | 411 |
| 48 | 0.158 | 411 |
| 49 | 0.158 | 411 |
| 50 | 0.156 | 411 |
| 51 | 0.156 | 412 |
| 52 | 0.156 | 412 |
| 53 | 0.154 | 412 |

-continued

| TIME (sec) | FLOW (mg/sec) | TOTAL MASS (mg) |
|---|---|---|
| 54 | 0.152 | 412 |
| 55 | 0.150 | 412 |
| 56 | 0.152 | 412 |
| 57 | 0.150 | 413 |
| 58 | 0.150 | 413 |
| 59 | 0.146 | 413 |
| 60 | 0.144 | 413 |
| 61 | 0.142 | 413 |
| 62 | 0.150 | 413 |
| 63 | 0.148 | 413 |
| 64 | 0.133 | 414 |
| 65 | 0.129 | 414 |
| 66 | 0.129 | 414 |
| 67 | 0.129 | 414 |
| 68 | 0.127 | 414 |
| 69 | 0.123 | 414 |
| 70 | 0.121 | 414 |
| 71 | 0.123 | 414 |
| 72 | 0.123 | 415 |
| 73 | 0.121 | 415 |
| 74 | 0.121 | 415 |
| 75 | 0.121 | 415 |
| 76 | 0.119 | 415 |
| 77 | 0.115 | 415 |
| 78 | 0.112 | 415 |
| 79 | 0.112 | 415 |
| 80 | 0.110 | 415 |
| 81 | 0.110 | 416 |
| 82 | 0.110 | 416 |
| 83 | 0.108 | 416 |
| 84 | 0.108 | 416 |
| 85 | 0.106 | 416 |
| 86 | 0.106 | 416 |
| 87 | 0.106 | 416 |
| 88 | 0.104 | 416 |

The processor established that steady-state was reached at 88 seconds and set the end point at 71 seconds. The processor integrated the sensed flow rate values from 0 seconds to 71 seconds to obtain a total mass of 414 mg.

The processor converted mass to moles by multiplying 414 mg gas by the average molecular weight of the gas (28 grams/mole) to obtain a value of 0.0148 moles of gas.

The processor the solved the Ideal Gas Law using the following values to arrive at a volume (V) of 331 cm$^3$.

Where
P=1 atmosphere
V=Volume
T=20° C.
n=0.0148 moles
R=Universal gas constant=8.3145 J/mol K

We claim:

1. An instrument for measuring volume of a hermetically sealed, variable volume, pressure conforming container, comprising:
   (a) a needle having a lumen operable for sealingly perforating a hermetically sealed, variable volume, pressure conforming container so as to place the lumen of the needle in fluid communication with a retention chamber defined by such a container,
   (b) a vacuum pump in fluid communication with the lumen effective for evacuating gaseous content from a hermetically sealed, variable volume, pressure conforming container via the lumen defined by the needle,
   (c) a mass flow rate sensor in sealed fluid communication with the lumen defined by the needle for sensing mass flow rates pulled through the lumen and transmitting corresponding mass flow rate signals over time,
   (d) an integrator (i) in electrical communication with the mass flow rate sensor for receiving the mass flow rate signals, and (ii) programmed to (A) integrate the received mass flow rate signals over time through achievement of an evacuated retention chamber to generate a total mass value, and (B) calculate a volume from the total mass value employing the ideal gas law.

2. The instrument of claim 1 further including a display unit for displaying the calculated volume.

3. The instrument of claim 1 further including a means for interfacing with and downloading the calculated volume to a processing unit for reporting, storage in a database, or use in additional algorithms.

4. A method of measuring volume of a hermetically sealed, variable volume, pressure conforming container, comprising:
   (a) obtaining a hermetically sealed, variable volume, pressure conforming container defining a retention chamber,
   (b) suctioning fluid from the retention chamber through a mass flow rate sensor for sensing mass flow rates of fluid suctioned from the retention chamber over time,
   (c) integrating the sensed mass flow rates over time through achievement of an evacuated retention chamber to generate a total mass value, and
   (d) calculating a volume for the container from the total mass value employing the ideal gas law.

5. The method of claim 4 further comprising displaying the calculated volume.

6. The method of claim 4 further comprising downloading of the calculated volume to a separate processing unit.

7. The method of claim 4 wherein the hermetically sealed, variable volume, pressure conforming container is a flexible bag filled with a particulate snack food.

8. The method of claim 7 wherein the flexible bag defines a headspace containing a gas with a reduced concentration of $O_2$.

9. The method of claim 8 wherein the snack food is potato chips.

10. The method of claim 9 wherein the gas is suctioned from the retention chamber by (i) sealingly perforating the container with a needle having a lumen so as to place the lumen of the needle in fluid communication with the retention chamber defined by the container, and (ii) operating a vacuum pump in sealed fluid communication with the lumen.

11. The method of claim 8 wherein the gas is suctioned from the retention chamber by (i) sealingly perforating the container with a needle having a lumen so as to place the lumen of the needle in fluid communication with the retention chamber defined by the container, and (ii) operating a vacuum pump in sealed fluid communication with the lumen.

12. The method of claim 4 wherein fluid is suctioned from the retention chamber by (i) sealingly perforating the container with a needle having a lumen so as to place the lumen of the needle in fluid communication with the retention chamber defined by the container, and (ii) operating a vacuum pump in sealed fluid communication with the lumen.

* * * * *